(12) United States Patent
Bukhari

(10) Patent No.: US 6,763,222 B1
(45) Date of Patent: Jul. 13, 2004

(54) LOW VOLTAGE INDICATION FOR NON-INTELLIGENT ODU EQUIPMENT

(75) Inventor: Mohammad N. Bukhari, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 1229 days.

(21) Appl. No.: 08/721,921

(22) Filed: Sep. 27, 1996

(51) Int. Cl.[7] ............................................. H04H 1/00

(52) U.S. Cl. ...................................... 455/3.02

(58) Field of Search ............................ 455/3.2, 9, 67.1, 455/127

(56) References Cited

U.S. PATENT DOCUMENTS 5,724,645 A * 3/1998 Na .............................. 455/3.2

* cited by examiner

Primary Examiner—William Cumming
(74) Attorney, Agent, or Firm—John T. Whelan; Michaell Salesk

(57) ABSTRACT

A VSAT communications outdoor unit for satellite communications has a saturated amplifier transmission circuit and a voltage detector. The voltage detector detects insufficient voltage to operate the transmission circuit. A signal generator connects and is responsive to a voltage detector output. The signal generator indicates with an external output that the transmitter is disabled. Preferably, the external output is separate from a link to the indoor unit. A switch for switching between the signal generator and an antenna pointing output responds to the voltage detector output.

25 Claims, 2 Drawing Sheets

≃30 msec.

1 sec.

LOW VOLTAGE INDICATION FOR NON-INTELLIGENT ODU EQUIPMENT

BACKGROUND OF THE INVENTION

The present invention relates generally to satellite communications terminals and more particularly to very small aperture terminal (VSAT) outdoor unit (ODU) communications equipment. VSAT remote terminals can be used to receive or communicate data, voice and video, from or to a central hub via a satellite. Typically, the VSAT remote terminals have a small aperture directional antenna for receiving from or transmitting signals to a satellite, the ODU mounted near the antenna for transmitting a modulated carrier, and an indoor unit (IDU) for generating the modulated carrier. The ODU is connected to the IDU with an IFL cable for transmitting signals between the ODU and IDU and for providing DC voltage to the ODU. The IDU also demodulates incoming signals received from the ODU and operates as an interface between a user's communication equipment and the ODU.

To install a VSAT remote terminal, the IDU is connected to the ODU with IFL cable. An installer then aims the directional antenna. The installer connects a voltage meter to an antenna pointing connector on the ODU. As the antenna is aimed towards the satellite, the IDU receives a signal from the satellite. A pulse width modulated signal is generated in response to the receipt of the satellite signal and output at the antenna pointing connector. The rate of the pulse width modulated signal is sufficiently high to allow the volt meter to measure an average DC voltage. As the antenna is aimed more accurately, the averaged DC voltage will decrease. Once the antenna is aimed, the installer goes indoors and attempts to transmit to the satellite from the IDU.

A transmission circuit is located in the ODU. To properly transmit, the transmission circuit needs a certain level of input DC voltage. A faulty or improper IFL cable will not provide sufficient input DC voltage to the ODU. The cable may be faulty or improper due to defects in a particular cable, improper selection of a cable resistance and/or cable length. A low voltage detection circuit in the ODU will disable the transmission circuit if the input DC voltage is too low.

Generally, there are two types of transmission circuits for use in an ODU. The first type is the intelligent transmission circuit. The intelligent transmission circuit has a processor for operating phase-shift keying circuitry, linear upconverters and a linear power amplifier. The processor is capable of detecting the input DC voltage and communicating with the IDU over the IFL cable. For instance, the ODU processor could inform the IDU that the DC voltage input is not high enough for proper transmission to the satellite. Thus, the installer would know to check the cable for irregularities. However, the installer would not know of this problem until after going indoors to the IDU.

The second type of transmission circuit is a non-intelligent or "dumb" transmission circuit. "Dumb" means the transmission circuit does not communicate with the IDU. Typically, the dumb transmission circuit has a phase-lock loop, frequency multiplier and a saturated amplifier. The dumb transmission circuit cannot inform the IDU that the DC voltage input is not high enough for proper transmission. The installer then unsuccessfully attempts to transmit. The installer does not know that the cable is faulty, believes the VSAT remote terminal is faulty and returns the VSAT remote terminal to the manufacturer.

Therefore, there is a need for a system and method for informing the installer that the cable is faulty. Further, there is a need for a system and method for informing the installer that the cable is faulty at the ODU.

SUMMARY OF THE INVENTION

The present invention provides an outdoor unit of a remote terminal designed to satisfy the aforementioned needs. Specifically, the present invention provides a novel design for the remote ground terminal that informs the installer at the ODU that the cable is faulty.

Accordingly, the present invention relates to a VSAT communications outdoor unit for satellite communications. The outdoor unit comprises a dumb transmission circuit and a voltage detection circuit. A signal generator operatively connects to the voltage detection circuit and is responsive to the voltage detection circuit. In one embodiment, the dumb transmission circuit comprises a saturated amplifier, and the signal generator comprises a low frequency oscillator for outputting a low frequency signal to an antenna pointing connector.

In another aspect of the invention, a VSAT communications outdoor unit for satellite communications is provided. The ODU comprises a transmission circuit and a voltage detection circuit. A signal generator responds to the output of the voltage detection circuit. An external output connects to the signal generator.

The present invention also relates to a method for indicating that a cable is malfunctioning in a VSAT communications remote terminal. The method comprises the steps of detecting in an outdoor unit an insufficient DC voltage to operate a transmission circuit and indicating with an external output that the transmitter is disabled. The external output is separate from a link to the indoor unit.

It is to be understood that both the foregoing general description and the following detailed description are exemplary and are intended to provide further explanation of the invention as claimed. The invention, together with further objects and attendant advantages, will be best understood by reference to the following detailed description in conjunction with the attached drawings.

DETAILED DESCRIPTION OF THE PRESENTLY PREFERRED EMBODIMENTS

Figure 1:
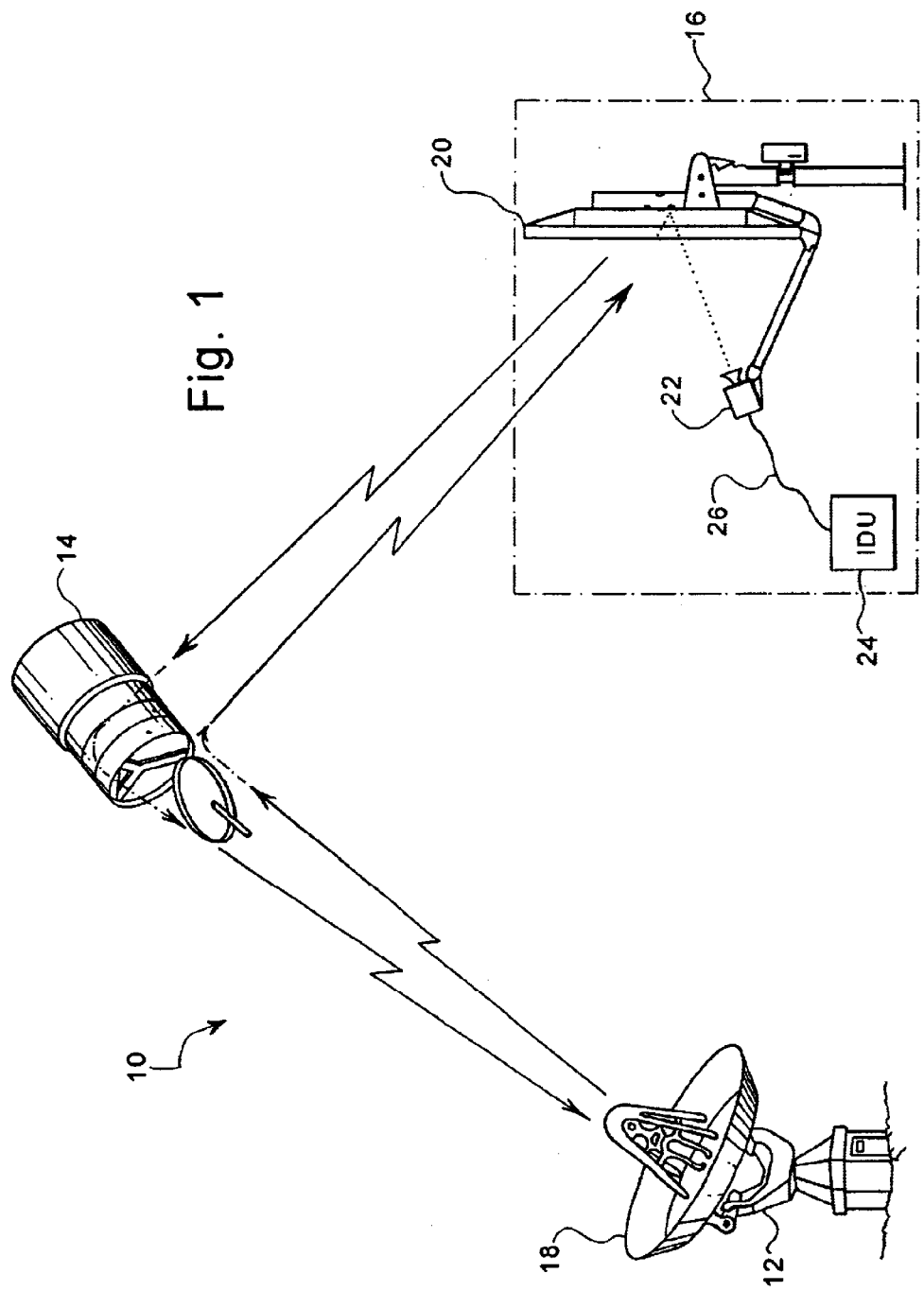
FIG. 1 illustrates a VSAT Satellite Communications Network.

The VSAT Satellite Communication Network 10 illustrated in FIG. 1 comprises a central hub station 12, a communication satellite 14, and a plurality of remote ground terminals 16 (only one is shown). The VSAT Network 10 functions as a two-way transmission system for transferring data and voice communications between the central hub station 12 and the remote ground terminals 16. All data is transferred between the central hub station 12 and the remote ground terminals 16 via transponders located in the satellite 14. Signals transmitted from the central hub station 12 to the remote ground terminal 16 are referred to as "out route," while signals transmitted in the opposite direction are referred to as "in route."

The central hub station 12 comprises a large antenna 18 to allow for the transmission of a sufficiently strong signal, such that the signal can be received by the remote ground terminals 16, which have relatively small antennas. The large antenna 18 of the central hub station 12 also compensates for the relatively weak signals transmitted by the remote ground terminals 16. As shown in FIG. 1, the communications satellite 14 functions as a microwave relay. It receives signals from both the central hub station 12 and the remote ground terminals 16 at a first frequency and then retransmits the signal at a second frequency. The satellite 14 comprises a transponder that receives, amplifies and retransmits each signal within a predefined bandwidth. The transponders of the VSAT Network 10 shown in FIG. 1 can operate in various frequency bands, for example, Ku and C Band.

The remote ground terminal 16 comprises a small aperture antenna 20 for receiving (i.e. downlink) and transmitting (i.e. uplink) signals and outdoor unit 22 typically mounted proximate the antenna 20. ODU 22 comprises a transmitter module for amplifying and frequency multiplying a modulated data signal which is coupled to the antenna 20. Indoor unit 24 operates as an interface between a specific users communication equipment and the outdoor unit 22. The IDU 24 also generates the modulated data signal which is amplified and frequency multiplied by the transmitter module of the ODU 22.

During normal operation, the IDU 24 receives data from the user's equipment (not shown in FIG. 1) and modulates a reference signal in accordance with this data. The modulation scheme utilized is such that the modulated data signal comprises an envelope having a constant amplitude. This modulated data signal is then transferred to the ODU 22. The transmitter module of the outdoor unit 22 functions to amplify and frequency multiply the modulated data signals so as to produce a modulated carrier signal. The modulated carrier signal is then coupled to the antenna 20 via a waveguide and feed horn, and transmitted to the satellite 14. Upon receipt by the central hub station 12 the modulated carrier signal is demodulated such that the data transmitted from the remote user is reproduced and processed by the central hub station 12.

The IDU 24 also supplies the ODU 22 with a DC voltage signal and a carrier on/off signal. Both of these signals are multiplexed with the modulated data signal and transferred to the ODU 22 as a single signal via an inter-facility link or cable 26, which in the preferred embodiment is a single IFL cable. Preferably, the cable is 50 or 70 ohm coaxial cable of a length shorter than 300 ft.

Figure 2:
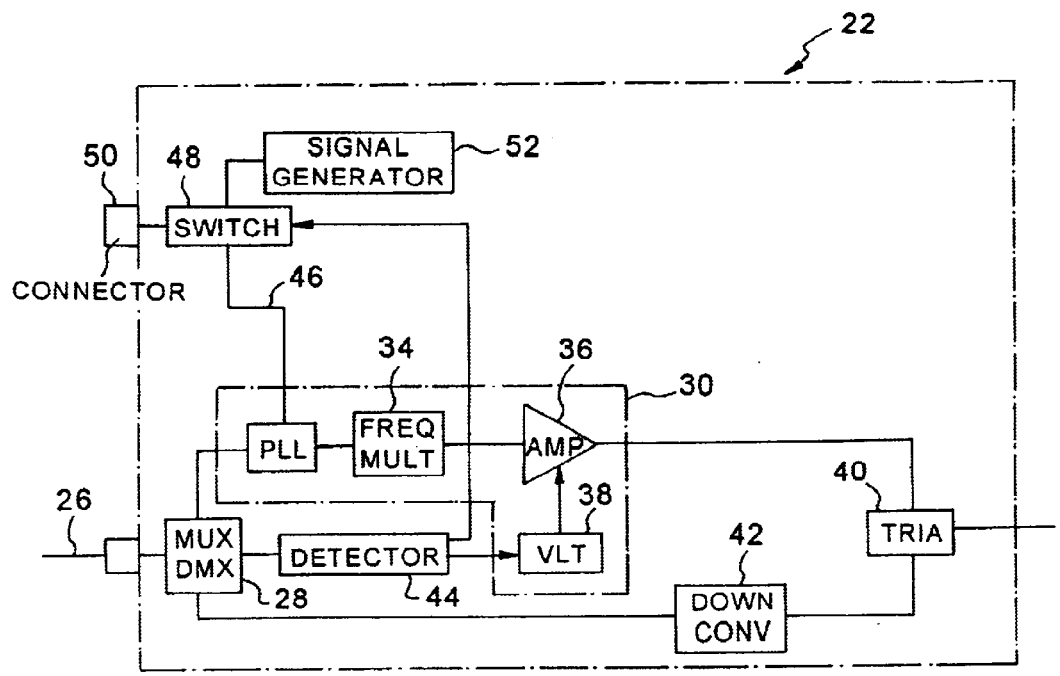
FIG. 2 is an outdoor unit in the network of FIG. 1.

Referring now to FIG. 2, the ODU 22 of the present invention is shown. The ODU 22 comprises a multiplexer/duplexer 28 for receiving the modulated data signal from cable 26 and for separating the modulated data signal and the carrier on/off signal received from the indoor unit (not shown). The ODU 14 also has a non-intelligent or "dumb" transmission circuit 30. The transmission circuit 30 is dumb because it lacks a processor able to communicate with the IDU via cable 26. The dumb transmission circuit 30 comprises a phased lock loop 32 for frequency stabilizing the modulated data signal, a frequency multiplier circuit 34, which preferably multiplies the frequency of the modulated data signal by two, a saturated amplifier 36 for amplifying the modulated carrier signal to preferably, approximately 1 watt, and a voltage level translator 38 for receiving a zero to five volt input and translating that input to a minus 2 to minus 6 volt signal. The saturated amplifier 36 is preferably a solid state power amplifier. The output of the saturated amplifier 36 is a modulated carrier signal as is known in the art. The modulated carrier signal is transmitted to a transmit receive isolation assembly ("TRIA") 40. The TRIA 40 contains multiple filters to separate various signals, as is known in the art. The output of the TRIA 40 is coupled to the antenna (not shown) via a feed horn (not shown), as is known in the art. The antenna then transmits the modulated carrier signal to the satellite.

The ODU 22 also comprises a receiver chain for receiving the downlink signal from the satellite. The antenna (not shown) receives the downlink signal via the feed horn (not shown) which transmits the signal to the TRIA 26. The TRIA 26 passes the received signal to a low noise block down converter 42. The low noise block down converter 42 transforms the received signal into a corresponding intermediate frequency signal, as is known in the art. The output of the low noise block down converter 42 is then coupled to the IDU via multiplexer/duplexer 28 and cable 26. The low noise block down converter 42 preferably comprises a low noise amplifier, and a mixer and local oscillator for down converting the frequency of the received signal. The frequency of the local oscillator is selected in accordance with the desired frequency of the intermediate frequency signal.

A detector 44 is coupled between the multiplexer/duplexer 28 and the voltage level translator 38. Preferably, the detector 44 comprises an amplitude detector, for example, a diode detector. The diode detector detects the presence of the carrier on/off signal having a frequency of 10.24 MHz. Other modulation techniques can be utilized to indicate the presence of the carrier signal. Of course, the detector 44 must be modified to detect the modulation technique utilized. The detector 44 also comprises an operational amplifier comparator for detecting the DC voltage level provided on cable 26. If the DC voltage is approximately 11 volts or greater, the transmission circuit 30 can properly transmit. The detector produces a substantially level DC output signal of zero to five volts. Accordingly, the detector 44 outputs a signal, preferably five volt DC signal, indicating that the carrier on/off signal is present and the DC voltage is sufficient, or, alternatively, outputs another signal, preferably zero volts, indicating that the carrier on/off signal is not present or that the DC voltage is insufficient.

Turning to the operation of the remote ground terminal, and in particular, outdoor unit 22, the multiplexer/duplexer 28 receives a multiplex signal from cable 26. This multiplex signal provides the modulated data signal, having a frequency of approximately 111 megahertz, DC voltage and the carrier on/off signal having a frequency of approximately 10.24 megahertz. The multiplexer/duplexer 28 couples the DC voltage signal to the various components of the ODU 22. The multiplexer/duplexer 28 functions to separate the modulated data signal and the carrier on/off signal. As shown in FIG. 2, the modulated data signal is coupled to an input of the phase lock loop 32, and the carrier on/off signal is coupled to the detector 44. In one embodiment, the multiplexer/duplexer 28 comprises a low pass filter and a high pass filter, each of which receives the multiplex signal. The outputs of the low and high pass filters are coupled to the inputs of the detector 44 and the phase lock loop 32, respectively.

The detector 44 detects the presence or the absence of the carrier on/off signal and the voltage level of the DC voltage signal. If the carrier on/off signal and a sufficient DC voltage are detected, then the detector 44 outputs to the voltage translator 38 a five volt signal. The voltage translator 38 converts the five volt signal into a minus two volt signal. The minus two volt signal is preferably coupled to the input DC voltage line of the saturated amplifier 36. Accordingly, if the detector 44 outputs a signal indicating the carrier on/off signal and sufficient DC voltage are present, the saturated amplifier 36 is enabled so that the input DC voltage line of the saturated amplifier 36 receives DC voltage and generates a modulated carrier signal. Alternatively, if the detector 44 outputs a zero volt signal indicating that the carrier on/off signal or sufficient DC voltage are not present, the voltage level translator switches the signal to a minus six volt signal so that the saturated amplifier 36 does not receive enough DC voltage to transmit the modulated carrier signal. The 111 megahertz modulated data signal output by the multiplexer/duplexer 28 is coupled to the input of the phase lock loop 32 of the dumb transmission circuit 30. The phase lock loop 32 is a standard phase lock loop comprising, for example, a phase detector having one input for receiving the 111 MHz signal, a low pass filter coupled to the output of a phase comparator, a voltage controlled oscillator coupled to the output of the low pass filter, and a frequency divider coupled to the output of the voltage controlled oscillator. The output of the frequency divider is coupled to a second input of the phase detector, so as to complete the loop. The output of the phase lock loop 32 is taken from the output of the voltage controlled oscillator. In a preferred embodiment, the frequency divider is selected such that the phase lock loop 32 multiplies the frequency of the 111 megahertz signal by approximately a factor sixteen so as to produce a data modulated signal of a first intermediate frequency. This signal is then coupled to a frequency multiplier 34, which multiplies the signal by a factor of two. Preferably the frequency multiplier 34 comprises a gallium arsenide FET coupled to a band pass filter which is tuned to the second harmonic of the first intermediate frequency signal. The output of the frequency multiplier 34 is coupled to the input of the saturated amplifier 36. The saturated amplifier 36 amplifies the modulated carrier signal and frequency multiplies the signal by four.

In the preferred embodiment, the modulation scheme utilized to generate the modulated data signal creates a signal having a constant envelope amplitude so as to allow for the use of a saturated amplifier 36. For example, a minimum shift keying technique can be utilized to modulate the data signals in the IDU. The minimum shift keying modulation techniques provide a modulated carrier signal having a constant amplitude envelope and a continuous phase way form. As a result, only the phase of the carrier signal is modulated, and a high power, non-linear amplifier (i.e., saturated) can be utilized to amplify the modulated carrier signal.

The output of the saturated amplifier 36 is inputted into the TRIA 40 that passes the signal via waveguide to the antenna 20. Thus, the modulated carrier signal is transmitted to the satellite 14.

Coupled to phase lock loop 32 is an antenna pointing output 46. In particular, the antenna pointing output is connected to the output of the low pass filter of phase locked loop 32. The antenna pointing output 46 is also coupled to switch 48. Switch 48 is preferably an analog type switch, but others may be used. Switch 48 connects to an antenna pointing connector 50. Antenna pointing connector 50 is an external port on the ODU 22. Detector 44 is connected to switch 48. In particular, the output of the operational amplifier comparator is connected to switch 48. This output controls the operation of switch 48. If a sufficient to transmit DC voltage signal is detected, then a five volt signal is provided to switch 48. If an insufficient to transmit DC voltage signal is detected, then a zero volt signal is provided to switch 48. Also connected to switch 48 is a signal generator 52. Preferably, signal generator 52 is a low frequency oscillator for generating a one Hertz signal. The output of the signal generator 52 is fed to switch 48.

To aim the antenna 20 at a satellite 14 for installation, the installer connects a digital volt meter (not shown) to the antenna pointing connector 50. Based on the reception of out route signals from satellite 14, the antenna pointing output 46 will comprise a variable pulse width modulated square wave. The satellite downlink signal is received by the ODU 22 and transmitted on cable 26 to the IDU. The IDU measures the signal strength of the downlink signal and transmits to the ODU 22 a transmit carrier signal. The transmit carrier signal switches between polar frequencies of the IDU carrier band. In particular, the transmit carrier signal switches between a 109.375 MHz signal and a 113.28125 MHz signal. As the signal strength of the downlink signal increases, the transmit carrier signal will be maintained as a 109.375 MHz signal with less frequent switching to a 113.28125 MHz signal. The phase lock loop 32 receives the transmit carrier signal. The phase lock loop 32 creates, at the low pass filter, the variable pulse width modulated square wave of FIG. 3. As better signal reception is achieved, the pulse frequency of the variable pulse modulated square wave generated by the antenna pointing circuit 46 decreases. Thus, the average DC voltage value shown at antenna pointing connector 50 decreases.

Figure 3:
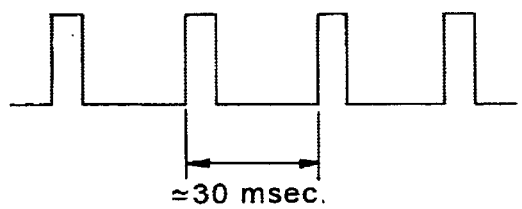
FIG. 3 is a waveform created by a remote terminal for painting an antenna.

If the DC voltage level on cable 26 is great enough to allow transmission by saturated amplifier 36, the detector 44 is outputting a five volt signal to switch 48. This detector 44 output signal causes switch 48 to pass the output of the antenna pointing output 46 to the antenna pointing connector 50. The five volt signal from detector 44 may also act to disable the low frequency oscillator 52. Thus, the output at antenna pointing connector 50 is the variable pulse width modulated square wave as shown in FIG. 3. The volt meter connected to antenna pointing connector 50 reads an average DC value of the high frequency variable pulse width modulated square wave. As the pulse width of the variable pulse width modulated square wave decreases due to more accurate aiming of antenna 20, the volt meter will read a lessor DC average voltage. Thus, antenna 20 is properly aimed, usually when an average two volt DC signal is measured on the volt meter.

Figure 4:
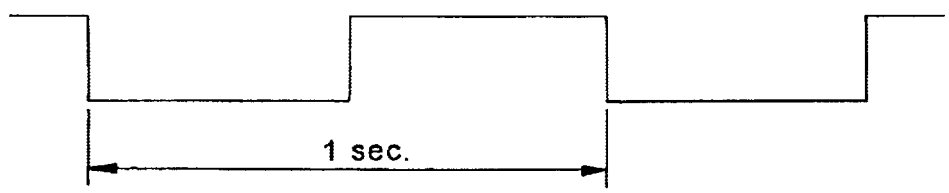
FIG. 4 is a waveform created by a remote terminal to indicate a faulty cable.

When the cable 26 is too resistive or too long, or has some other DC voltage depleting fault, the DC voltage of the modulated data signal will be insufficient to allow transmission. Detector 44 detects this low DC value and outputs a zero volt signal to switch 48. That zero volt signal causes switch 48 to pass the output of the signal generator 52 to the antenna pointing connector 50. Thus, the output at the antenna pointing connector 50 is a 1 hertz square wave as shown in FIG. 4. The one hertz square wave will cause the volt meter to oscillate. An oscillating volt meter will indicate to an installer that insufficient DC voltage is being provided for transmission from the ODU 22.

The outdoor unit of the present invention provides numerous advantages. For example, providing a low frequency square wave at the antenna pointing connector 50 when cable 26 reduces the DC voltage informs an installer to check the cable. As a result, the cable is replaced and no delay results from returning the VSAT remote terminal when nothing is wrong with the terminal.

Of course, it should be understood that a wide range of changes and modifications can be made to the preferred embodiment described above. For example, while the ODU described above has a dumb transmission circuit, the invention could also be used on an ODU with a processor. Thus, it is intended that the foregoing detailed description be regarded as illustrative rather than limiting.

It is the following claims, including all equivalents, which are intended to define the scope of this invention.

I claim:

1. A method of indicating a malfunction of a communications link connecting an indoor unit and an outdoor unit of a communications system, wherein the outdoor unit comprises a dumb transmission circuit, the method comprising the steps of:
   a. detecting the malfunction of the communications link at the outdoor unit; and
   b. indicating the malfunction with an external output at the outdoor unit.

2. The method of claim 1, wherein the step of detecting the malfunction of the communications link at the outdoor unit further comprises detecting a voltage level of an input signal transmitted from the indoor unit to the outdoor unit via the communications link.

3. The method of claim 2, wherein the step of detecting the malfunction of the communications link at the outdoor unit further comprises:
   a. detecting the voltage level of the input signal;
   b. comparing the voltage level with a threshold voltage; and
   c. determining the malfunction exists if the detected voltage is below the threshold voltage.

4. The method of claim 1, wherein the step of indicating the malfunction with an external output comprises generating and outputting a low frequency signal.

5. The method of claim 4, wherein the step of indicating the malfunction with an external output further comprises outputting the low frequency signal in place of an antenna pointing signal.

6. The method of claim 3, wherein the step of indicating the malfunction with an external output further comprises generating a low frequency signal and switching from outputting an antenna pointing signal to outputting the low frequency.

7. A communications apparatus comprising:
   a communications link;
   an indoor unit connected to a first end of the communications link;
   an outdoor unit connected a second end of the communications link, the outdoor unit comprising:
      a dumb transmission circuit for receiving an input signal transmitted from the indoor unit via the communications link;
      a malfunction detector for receiving the input signal transmitted from the indoor unit via the communications link, detecting a malfunction of the communications link based on the input signal and generating an output signal indicating the presence of the malfunction.

8. The apparatus of claim 7, wherein the malfunction detector comprises:
   a voltage detector for detecting a voltage level of the input signal and a generating a detector output signal indicating the detected voltage level of the input signal; and
   a signal generator for generating the output signal indicating the presence of the malfunction based on the detector output signal.

9. The apparatus of claim 8 wherein the dumb transmission circuit comprises a saturated amplifier.

10. The apparatus of claim 9 wherein the dumb transmission circuit further comprises:
    a. a phase lock loop; and
    b. a multiplier operatively connected to the phase lock loop and the saturated amplifier.

11. The apparatus of claim 8, wherein the signal generator comprises:
    a. an oscillator for generating a low frequency signal; and
    b. an external port operatively connected to the oscillator for receiving the low frequency signal.

12. The apparatus of claim 11 further comprising a switch, wherein:
    a. the dumb transmission circuit generates an antenna pointing output signal based on the input signal;
    b. the switch receives the low frequency signal from the oscillator, the antenna pointing output signal from the dumb transmission circuit, and the detector output signal from the voltage detector and alternatively supplies the low frequency signal and the antenna pointing output signal to the external port in accordance with detector output signal; and
    c. the external port comprises an antenna pointing connector.

13. The apparatus of claim 11 wherein the oscillator is a low frequency oscillator.

14. The apparatus of claim 7, wherein the input signal comprises a DC voltage signal.

15. The apparatus of claim 8, wherein the voltage detector comprises an operational amplifier comparator.

16. An outdoor communications apparatus comprising:
    a. a transmission circuit for receiving an input signal transmitted over a communications link;
    b. a voltage detector for receiving the input signal, detecting a malfunction of the communications link by detecting a voltage level of the input signal, and generating a detector output signal;
    c. a signal generator for generating a malfunction indication signal based on the detector output signal; and
    d. an external output terminal operatively connected to the signal generator for providing an external malfunction indication.

17. The apparatus of claim 16 wherein the transmission circuit comprises a dumb transmission circuit.

18. The apparatus of claim 17 wherein the dumb transmission circuit comprises a saturated amplifier.

19. The apparatus of claim 16, wherein the transmission circuit comprises a processor operatively connected via the communications link to an indoor unit.

20. The apparatus of claim 16, wherein the signal generator comprises an oscillator.

21. The apparatus of claim 20 wherein:
    a. the transmission circuit generates an antenna pointing output based on the input signal;
    b. a switch receives the malfunction indication signal from the oscillator, the antenna pointing output signal from the transmission circuit, and the detector output signal from the voltage detector and alternatively supplies the malfunction indication signal and the antenna pointing output signal to the external output terminal; and
    c. the external output terminal comprises an antenna pointing connector.

22. A method of indicating a malfunction of a communications link connecting an indoor unit and an outdoor unit of a communications system, the method comprising the steps of:

transmitting a transmission signal from the indoor unit via the communications link;

receiving the transmission signal at the outdoor unit;

detecting the malfunction of the communications link at the outdoor unit; and indicating the malfunction with an external output at the outdoor unit, the external output being separate from communications link connecting the indoor unit and the outdoor unit.

23. The method of claim 22, wherein the step of detecting the malfunction of the communications link at the outdoor unit comprises detecting a voltage level of the transmission signal transmitted from the indoor unit via the communications link to the outdoor unit.

24. The method of claim 22, wherein the step of indicating the malfunction with an external output comprises generating a low frequency signal on the external output.

25. The method of claim 24, wherein the step of indicating the malfunction with an external output further comprises replacing an antenna pointing signal with the low frequency signal.

* * * * *